United States Patent [19]

Kawamura

[11] Patent Number: 4,946,097
[45] Date of Patent: Aug. 7, 1990

[54] CONTROL SYSTEM FOR HEATING CONTAINER FOR USE ON MOTOR VEHICLE

[75] Inventor: Hideo Kawamura, Samukawa, Japan
[73] Assignee: Isuzu Motors Limited, Tokyo, Japan
[21] Appl. No.: 362,226
[22] Filed: Jun. 7, 1989
[30] Foreign Application Priority Data
Jun. 10, 1988 [JP] Japan ................... 63-143092
[51] Int. Cl.$^5$ ........................... G05D 23/00
[52] U.S. Cl. .............. 237/2 A; 237/12.3 C; 237/12.3 A
[58] Field of Search ............ 237/12.3 B, 12.3 C, 237/2 A; 165/42, 41; 98/2.01

[56] References Cited

U.S. PATENT DOCUMENTS 2,118,884  5/1938  Fuchs ............ 237/12.3 B X

Primary Examiner—Henry A. Bennet
Attorney, Agent, or Firm—Staas & Halsey

[57] ABSTRACT

A control system for keeping hot the interior of a heating container on a motor vehicle supplies the heating container with hot air to which heat of a gas produced by burning fuel in a burner has been transferred by a heat exchanger. The control system has a container air temperature sensor for detecting the temperature in the heating container, an ambient air temperature sensor, and a door movement sensor for detecting whether a door of the heating container is opened or closed. When the temperature in the heating container is low and the door of the heating container is opened, the rate of fuel supplied by a fuel pump to the burner and the rate of hot air supplied by a blower to the heating container are controlled depending on the temperature of ambient air.

3 Claims, 3 Drawing Sheets

FIG. 3

|  | | RATE OF HOT AIR SUPPLIED | | RATE OF FUEL SUPPLIED | |
|---|---|---|---|---|---|
|  | | HIGH | LOW | HIGH | LOW |
| QUICK HEATING | | ○ | | ○ | |
| AMBIENT AIR TEMP. WHEN DOOR IS OPENED | LOW | ○ | | ○ | |
|  | HIGH | ○ | | | ○ |
| TEMP. DIFF. WHEN CONTAINER TEMP. IS TO BE KEPT | SMALL | ○ | | | ○ |
|  | LARGE | | ○ | | ○ |

CONTROL SYSTEM FOR HEATING CONTAINER FOR USE ON MOTOR VEHICLE

BACKGROUND OF THE INVENTION

The present invention relates to a control system for supplying hot air into a heating container mounted on a motor vehicle to keep the interior of the heating container hot.

FIELD OF THE INVENTION

Heating containers on motor vehicles are employed to delivery foods or chemicals while keeping them hot at certain temperatures.

DESCRIPTION OF THE RELATED ART

One conventional heating container for use on a motor vehicle is disclosed in Japanese Laid-Open Patent Publication No. 61-211118, for example. The disclosed heating container is controlled by a control system including a burner for burning fuel, a heat exchanger for transferring heat of a combustion gas produced by the burned fuel in the burner to air which is to be fed as hot air into the heating container, and a means for introducing the hot air from the heat exchanger into the heating container. The combustion of the fuel in the burner is controlled in order to keep the temperature in the heating container at a predetermined level.

According to the above prior heating container, even when the temperature in the heating container has dropped due to an egress of hot air from the heating container, at the the door of the heating container is opened and closed, the same control process for controlling the combustion in the burner as that for keeping the temperature in the heating container at a predetermined level is performed. Since the rate at which the temperature in the heating container drops or recovers largely varies depending on the temperature of ambient air when the heating container door is opened and closed, the conventional control process for achieving the desired temperature in the heating container has not necessarily been satisfactory.

SUMMARY OF THE INVENTION

It is an object of the present invention to provide a control system for controlling the temperature in a heating container at a predetermined level by controlling fuel combustion in a burner based on the temperature of ambient air outside of the heating container.

According to the present invention, there is provided a control system for supplying hot air into a heating container on a motor vehicle to keep the interior of the heating container hot, said control system including a burner adapted to be mounted on the motor vehicle for burning fuel, fuel supply means for supplying fuel to said burner, a heat exchanger for transferring heat of a gas produced by burning fuel in said burner to air to be supplied to the heating container, a blower for supplying hot air heated by said heat exchanger into the heating container, a container air temperature sensor for detecting temperature in the heating container and outputting a signal indicative of said heating container temperature, an ambient air temperature sensor for detecting temperature of ambient air outside of the motor vehicle and outputting a signal indicative of said ambient air, a door movement sensor for detecting whether a door of the heating container is in an opened or closed position and outputting a signal indicative of said position and control means for controlling said fuel supply means and said blower based on the signals output from said container air temperature sensor, said ambient air temperature sensor, and said door movement sensor.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a table showing various control modes achieved by the control system.

DETAILED DESCRIPTION OF THE PREFERRED EMBODIMENT

Figure 1:
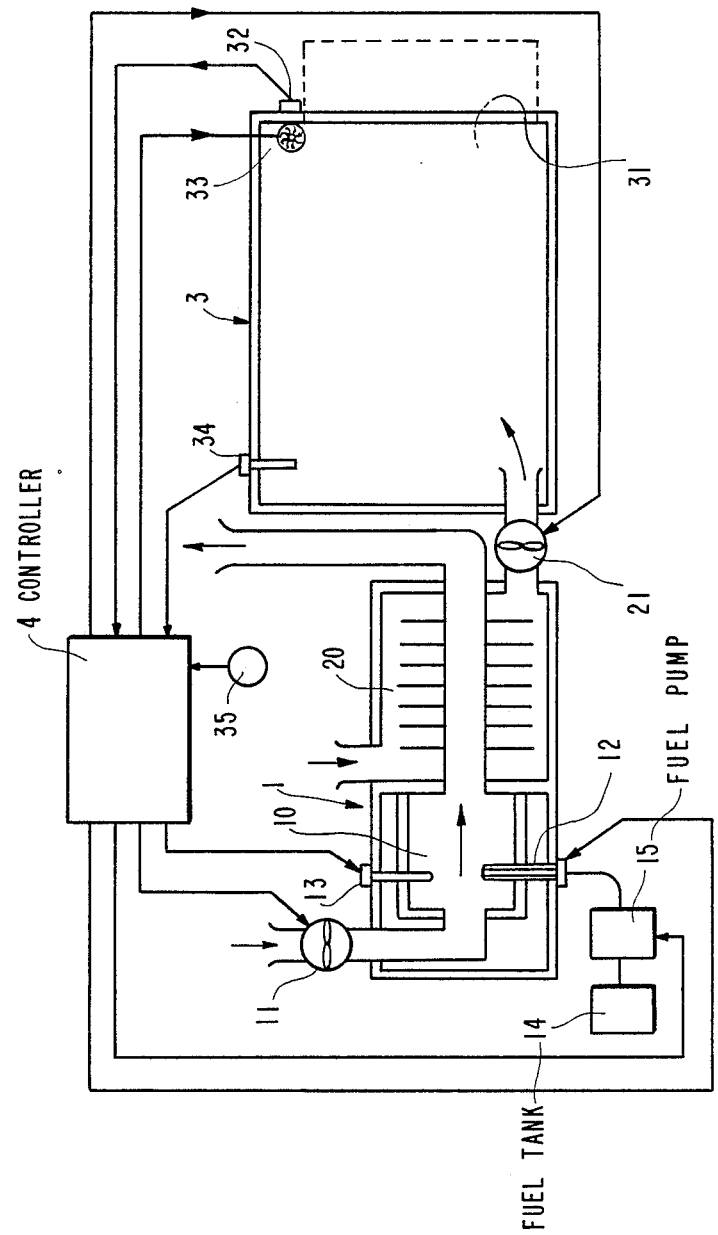
FIG. 1 is a schematic block diagram of a control system for a heating container for use on a motor vehicle according to a preferred embodiment of the present invention.

As shown in FIG. 1, a burner 1 has a combustion chamber 10, formed therein, and also includes an atomizing glow plug 12 as a fuel atomizer for atomizing fuel to be supplied to the combustion chamber 10, and an igniting glow plug 13 for igniting the fuel atomized by the atomizing glow plug 12. The atomized fuel supplied from the atomizing glow plug 12 is mixed with air introduced into the combustion chamber 10 by a combusting air blower 11. The air-fuel mixture is ignited and combusted in the combustion chamber 10 by the igniting glow plug 13. An exhaust gas produced by burning the air-fuel mixture in the combustion 10 flows through a heat exchanger 20 (described later) and is discharged out of the burner 1.

Fuel stored in a fuel tank 14 is supplied to the atomizing glow plug 12 by a fuel pump 15 which is controlled by a control signal applied by a controller 4 (described later on).

The heat exchanger 20 is coupled to the burner 1 for transferring heat of the gas exhaust discharged from the combustion chamber 10 to air that is to be supplied to a heating container 3. Hot or heated air produced by the heat exchanger 20 is supplied to the heating container 20 by a hot air blower 21. The rate at which the hot air is supplied to the heating container 20 by the hot air blower 21 is controlled by a control signal from the controller 4.

The heating container 3, which is mounted on a motor vehicle (not shown), has a door 31 on its rear panel. The hot air from the heat exchanger 20 is supplied into the heating container 3 from its lower portion by the hot air blower 21. The supplied hot air is then circulated back to the heat exchanger 20 through a duct (not shown). A fan 33 is disposed in an upper rear portion of the heating container 3. When the door 31 is opened, the fan 33 is rotated by a control signal from the controller 4 to create an air curtain over the door opening in the rear container panel to prevent the hot air from flowing out of the heating container 3.

The heating container 3 is associated with a door movement sensor 32 for detecting whether the door 31 is opened or closed, a container temperature sensor 34 for detecting the temperature in the heating container 3, and an ambient temperature sensor 35 for detecting the temperature of ambient air outside of the motor vehicle. Detected signals from these sensors are transmitted to the controller 4.

The controller 4 comprises a microcomputer including a central processing unit, various memories, and an input/output unit. The controller 4 generates and applies control command signals to the fuel pump 15, the hot air blower 21, the combusting air blower 11, the atomizing glow plug 12, the igniting glow plug 13, and the fan 33 according to a control program stored in one of the memories based on detected signals transmitted from the sensors 32, 34, 35.

Figure 2:
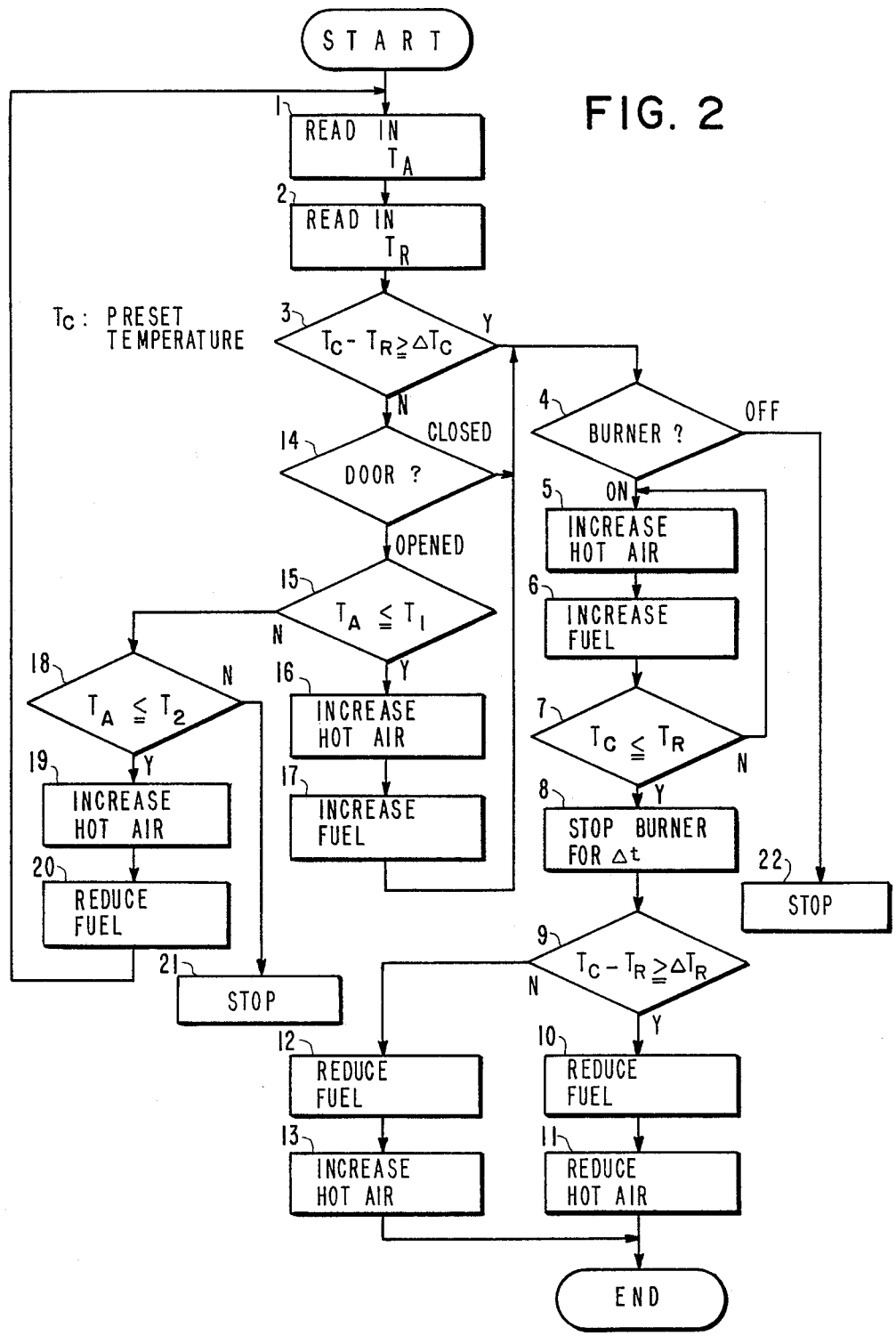
FIG. 2 is a flowchart of a control sequence to be performed by the control system.

Operation of the heating container control system thus constructed will be described with reference to the control sequence shown in FIG. 2.

The controller 4 reads in an ambient air temperature $T_A$ from the detected signal supplied from the ambient air temperature sensor 35 in a step 1, and then reads in a container air temperature $T_R$ from the detected signal supplied from the container temperature sensor 34 in a step 2. Then, the controller 4 determines the difference between the container air temperature $T_R$ and a preset container air temperature $T_C$ and compares the difference with a predetermined temperature range $\Delta T_C$ in a step 3. If the difference $T_{C-TR}$ is greater than or equal to the temperature range $\Delta T_C$ in the step 3, then control proceeds to a step 4 which determines whether the burner 1 is turned on or not. If the burner 1 is turned on or operated, the rate of hot air delivered by the hot air blower 21 is increased in a step 5, and the rate of fuel supplied by the fuel pump 15 is also increased in a step 6. Then, a step 7 determines whether the container air temperature $T_R$ has reached the preset container air temperature $T_C$ or not. If not, then the steps 5 and 6 are repeated. If yes, then control goes to a step 8 in which operation of the burner 1 is temporarily stopped for a time $\Delta t$. Thereafter, the difference $T_C - T_R$ between the preset container air temperature $T_C$ and the container air temperature $T_R$ is compared with a predetermined temperature range $\Delta T_R$ (which is smaller than $\Delta T_C$) in a step 9. If $T_{C-TR}$ is greater than or equal to $\Delta T_R$ in the step 9, then control goes to a step 10 to reduce the rate of fuel supplied by the fuel pump 15 and to reduce the rate of hot air supplied by the hot air blower 21 in order to slightly increase the temperature in the heating container 3. If $T_C - T_R$ is less than $\Delta T_R$ in the step 9, then the rate of fuel supplied by the fuel pump 15 is reduced in a step 12 and the rate of hot air supplied by the hot air blower 21 is increased in a step 13, thus slightly lowering the temperature in the heating container 3.

If the difference $T_C - T_R$ between the preset container air temperature $T_C$ and the container air temperature $T_R$ is smaller than the predetermined temperature range $\Delta T_C$ in the step 3, then control proceeds to a step 14 and the rate of fuel supplied by the fuel pump 15 and the rate of hot air supplied by the hot air blower 21 are controlled depending on whether the door 31 is opened or closed. More specifically, the step 14 determines whether the door 31 is opened or closed based on the detected signal from the door movement sensor 32. If the door 31 is closed, control goes to the step 4. If the door 31 is opened in the step 14, then a step 15 compares an ambient air temperature $T_A$ and a first preset temperature $T_1$. If the ambient air $T_A$ is lower than or equal to the first preset temperature $T_1$, then the rate of hot air supplied by the hot air blower 21 is increased in a step 16 and the rate of fuel supplied by the fuel pump 15 is increased in a step 17, so that the burner 21 is operated to its full capacity. If the ambient air temperature $T_A$ is higher than the first preset temperature $T_1$ in the step 15, then the ambient temperature $T_A$ is compared in a step 18 with a second preset temperature $T_2$ which is higher than the first preset temperature $T_1$. If the ambient air temperature $T_A$ is less than or equal to the second preset temperature $T_2$, the rate of hot air supplied by the hot air blower 21 is increased in a step 19 and the rate of fuel supplied by the fuel pump 15 is reduced in a step 20. If the ambient air temperature $T_A$ is higher than the the second preset temperature $T_2$, in the step 18, then control goes to a step 21 in which the operation of the burner 1 is stopped.

In the above embodiment, the rate of hot air supplied by the hot air blower 21 and the rate of fuel supplied by the fuel pump 15 are controlled based on the temperature in the heating container 3, the ambient air temperature, and whether the door 31 is opened or closed. Various control modes performed by the control system of the invention are indicated in the table of FIG. 3. More specifically, when the interior of the heating container 3 is quickly heated in the steps 4 through 6, the rate of hot air supplied by the hot air blower 21 and the rate of fuel supplied by the fuel pump 15 are increased. When the door 31 is opened, the rate of hot air supplied by the hot air blower 21 and the rate of fuel supplied by the fuel pump 15 are increased in the steps 15 through 17 if the ambient air temperature is low, and the rate of hot air supplied by the hot air blower 21 is increased and the rate of fuel supplied by the fuel pump 15 is reduced in the steps 18 through 20 if the ambient air temperature is high. When the temperature in the heating container 3 is to be maintained, the rate of hot air supplied by the hot air blower 21 and the rate of fuel supplied by the fuel pump 15 are reduced in the steps 9 through 11 if the difference between the container air temperature and the preset temperature is large, and the rate of hot air supplied by the hot air blower 21 is increased and the rate of fuel supplied by the fuel pump 15 is reduced in the steps 9, 12, 13 if the difference between the container air temperature and the preset temperature is small.

Although a certain preferred embodiment has been shown and described, it should be understood that many changes and modifications may be made therein without departing from the scope of the appended claims.

What is claimed is:

1. A control system for supplying hot air into a heating container on a motor vehicle to keep the interior of the heating container hot, said control system comprising:

a burner adapted to be mounted on the motor vehicles for burning fuel;

fuel supply means for supplying fuel to said burner;

a heat exchanger for transferring heat of an exhaust gas produced by burning fuel in said burner to air to be supplied to the heating container;

a blower for supplying hot air heated by said heat exchanger into the heating container;

a container air temperature sensor for detecting the temperature in the heating container;

an ambient air temperature sensor for detecting the temperature of ambient air outside of the motor vehicle;

a door position sensor for detecting whether a door of the heating container is in an opened or closed position; and control means coupled to said container air temperature sensor, ambient air temperature sensor, and door position sensor for controlling said fuel supply means and said blower based on the temperature and door position detected by said container air temperature sensor, said ambient air temperature sensor, and said door position sensor, respectively, wherein said control means comprises means for controlling said fuel supply means to supply fuel at a higher rate and for controlling said blower to supply hot air at a higher rate if the temperature of ambient air is lower than a first preset ambient air temperature when the temperature in the heating container is lower than a predetermined temperature and the door of the heating container is opened.

2. A control system according to claim 1, wherein said control means comprises means for controlling said fuel supply means to supply fuel at a lower rate and for controlling said blower to supply hot air at a higher rate if the temperature of ambient air is lower than a second preset ambient air temperature higher than said first preset ambient air temperature when the temperature in the heating container is lower than the predetermined temperature and the door of the heating container is opened.

3. A control system according to claim 1, further comprising a second blower controlled by the control means to provide an air curtain at the door of the heating container when the door is detected to be open.

* * * * *